United States Patent
Park et al.

[11] Patent Number: 6,148,674
[45] Date of Patent: Nov. 21, 2000

[54] SHIELDED CAPACITIVE PRESSURE SENSOR

[76] Inventors: Kyong M. Park, 3511 Indian Ridge Cir., Thousand Oaks, Calif. 91362; Abe Rosales, 16857 San Fernando Mission Blvd., #51, Granada Hills, Calif. 91344

[21] Appl. No.: 09/396,274

[22] Filed: Sep. 15, 1999

[51] Int. Cl.⁷ .................................................. G01L 9/12
[52] U.S. Cl. .............................................. 73/724; 73/718
[58] Field of Search .......................... 73/715, 714, 718, 73/724; 361/283.4

[56] References Cited

U.S. PATENT DOCUMENTS

| | | | |
|---|---|---|---|
| 4,151,578 | 4/1979 | Bell | 361/283 |
| 4,158,217 | 6/1979 | Bell | 361/283 |
| 4,177,496 | 12/1979 | Bell et al. | 361/283 |
| 4,207,604 | 6/1980 | Bell | 361/283 |
| 4,227,419 | 10/1980 | Park | 73/724 |
| 4,329,732 | 5/1982 | Kavli et al. | 361/283 |
| 4,388,668 | 6/1983 | Bell et al. | 361/283 |
| 4,398,426 | 8/1983 | Park et al. | 73/724 |
| 4,425,799 | 1/1984 | Park | 73/718 |
| 4,426,673 | 1/1984 | Bell et al. | 361/283 |
| 4,617,607 | 10/1986 | Park et al. | 361/283 |
| 4,680,971 | 7/1987 | Kavli et al. | 73/718 |
| 4,735,098 | 4/1988 | Kavli et al. | 73/718 |
| 4,974,117 | 11/1990 | Irwin | 361/283 |
| 5,020,377 | 6/1991 | Park | 73/718 |
| 5,233,875 | 8/1993 | Obermeier et al. | 73/718 |
| 5,275,054 | 1/1994 | Park | 73/724 |
| 5,315,877 | 5/1994 | Park et al. | 73/724 |
| 5,329,819 | 7/1994 | Park et al. | 73/724 |
| 5,349,491 | 9/1994 | Obermeier | 361/283.4 |
| 5,349,865 | 9/1994 | Kavli et al. | 73/724 |
| 5,349,867 | 9/1994 | Park | 73/727 |
| 5,553,502 | 9/1996 | Hsieh | 73/724 |
| 5,656,780 | 8/1997 | Park | 73/724 |

*Primary Examiner*—Max Noori
*Assistant Examiner*—Abdullahi Aw-musse
*Attorney, Agent, or Firm*—Oppenheimer Wolff & Donnelly LLP

[57] ABSTRACT

A capacitive pressure transducer which is shielded so that water or another fluid with a relatively high dielectric constant can be measured more accurately, as the sensor is unaffected by the relative tendency of the fluid to influence the measured capacitance, including an electrode associated with a diaphragm on a first side opposite a second, wetted, side coupled to the fluid, the diaphragm electrode being of the same or larger size than a second electrode separated therefrom by a gap, and the diaphragm electrode extending radially outward to or beyond an annular seal on or adjacent the wetted side confining fluid to an area within the outer peripheral confines of the diaphragm and within an area comprising a portion of the wetted side of the diaphragm opposite the diaphragm's electrode.

25 Claims, 3 Drawing Sheets

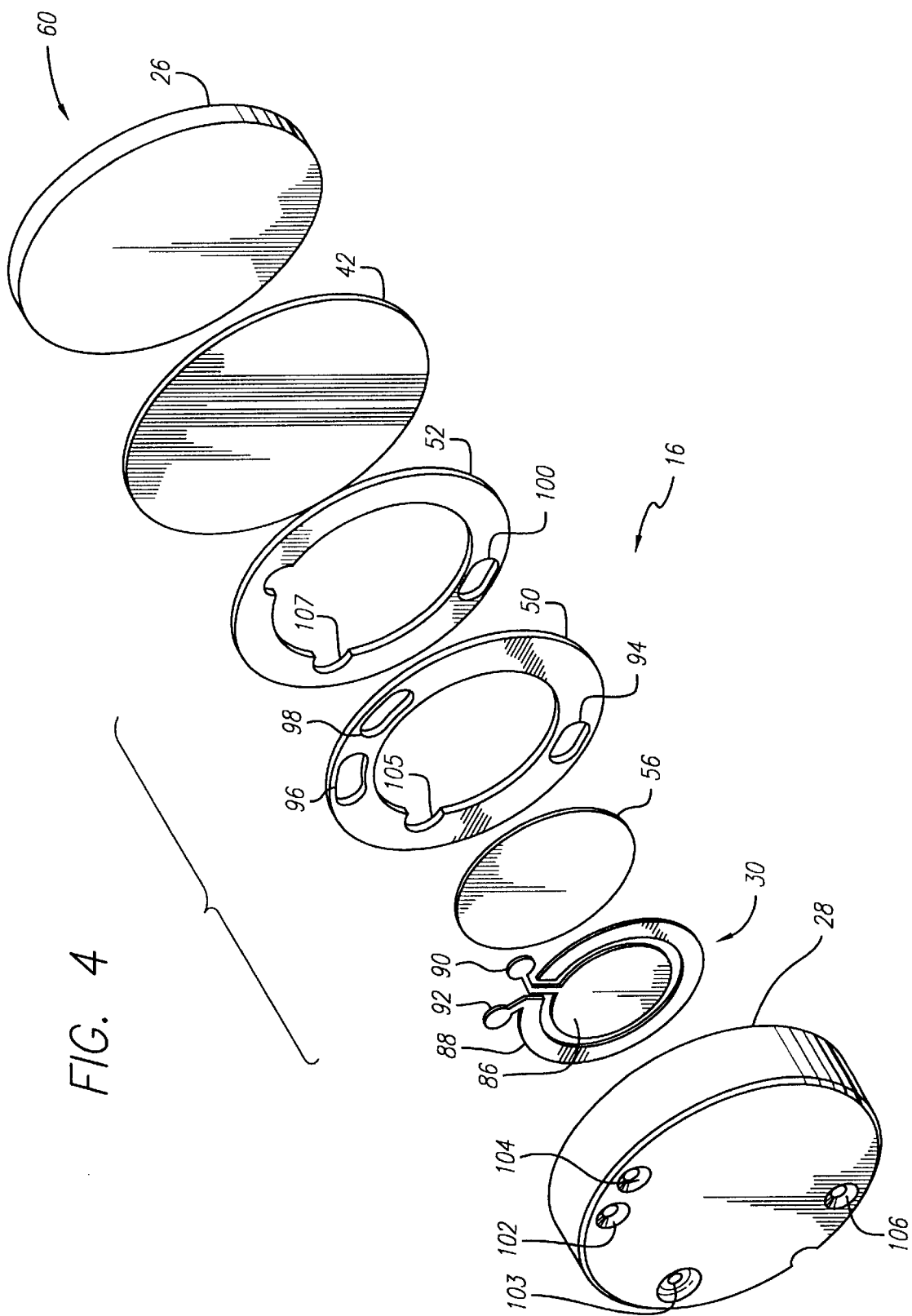

SHIELDED CAPACITIVE PRESSURE SENSOR

BACKGROUND OF THE INVENTION

1. Field of the Invention

The invention relates to sensors for determining a fluid pressure. More particularly, the invention relates to capacitive pressure transducers producing an electrical signal indicative of a sensed fluid pressure.

2. Description of the Related Art

Capacitive pressure transducers generally work by sensing the change in capacitance upon deflection of at least one diaphragm, including in its construction conductive metal comprising an electrode, with respect to another electrode. The deflecting diaphragm is coupled to the fluid and moves from a first position to a second, different, position with respect to the other electrode in response to a change in pressure. Such pressure transducers have many advantages, including simplicity, low cost, and reliability.

Examples of pressure transducers of this type are described in U.S. Pat. Nos. 4,227,419, granted Oct. 14, 1980; 4,388,688, granted Jun. 14, 1983; 4,398,426, granted Aug. 16, 1983; 4,617,607, granted Oct. 14, 1986; 5,275,054, granted Jan. 4, 1994; 5,315,877, granted May 32, 1994; 5,329,819, granted Jul. 19, 1994; 5,349,865, granted Sep. 27, 1994; and 5,553,502, granted Sep. 10, 1996. All of these patents are assigned to the assignee of the present invention.

In a typical construction, a diaphragm formed of low mechanical hysteresis insulating material, such as a glass or a ceramic material, such as alumina for example, is employed. When pressure is applied to the diaphragm it flexes toward an adjacent base member, normally of the same or a similar material. As mentioned, layers of conductive material, such as gold metal, form electrodes on facing surfaces of the diaphragm and base member. The base member compares a substrate supporting a layered construction including a peripheral spacer, or glass frit, between the substrate and the diaphragm. As the diaphragm moves in response to a change in pressure of a fluid, the spacing between conductive layers forming electrodes on facing surfaces is changed, thereby changing the capacitance between the two conductive-layer electrodes. Circuitry included with or electrically connected to the transducer converts the capacitance to an electrical signal varying linearly with the pressure sensed, and thereby indicates pressure and pressure changes.

However, use of such a pressure transducer with a fluid having a relatively high dielectric constant, such as water, or even under certain circumstances a vapor of such a fluid, such as water condensation from moist air, can pose problems for this type of sensor. As measured capacitance is the parameter used to give an indication of pressure, the accuracy of the sensor can be affected by changes in capacitance from causes other than deflection of the diaphragm plate due to pressure or change in pressure. If a dielectric fluid, such as water, for example, or even a vapor of such a fluid, can migrate into the sensor to a point that it changes the capacitance by virtue of its presence alone, accuracy will be adversely affected.

For convenient reference, water will be used as an example of a problematic fluid. The dielectric constant of air has a value of just over 1, while that of water is about 80, at room temperature. As will be appreciated, even a small amount of water can affect capacitance, as the energy used to align the water molecules in proximity to the oppositely charged electrodes is a direct loss to the capacitor. However, this use of water is for purposes of exemplary illustration only, and the invention is not limited to a particular problematic fluid.

SUMMARY OF THE INVENTION

It has been found that a dielectric fluid such as water or water vapor migrating into spaces radially outward from an electrode, comprising for example a coated metal layer on the diaphragm, can affect the capacitance between the electrodes as discussed above. To mitigate this problem the invention provides a capacitive pressure transducer comprising a diaphragm having a wetted surface and a facing surface, a diaphragm electrode comprising a metallic layer associated with the diaphragm, a base surface including a base electrode comprising a metallic layer associated with the base, a spacer separating the diaphragm from the base, a housing defining a fluid chamber adjacent the diaphragm, and an annular seal disposed between the diaphragm and the housing, the diaphragm electrode extending radially outward at least as far as the location of the seal; whereby the diaphragm electrode electrically screens or otherwise shields the dielectric fluid from the base electrode and vice-versa so as to shield the capacitive interaction of the electrodes from influence of the dielective fluid. In a preferred embodiment, the diaphragm electrode has a diameter substantially greater than the facing base electrode of the variable capacitor; and the diaphragm electrode preferably extends for the full facing surface of the diaphragm.

In a more detailed aspect, the transducer can include a fluid chamber defined by the housing and the diaphragm and the annular seal, configured to confine a pressurized fluid adjacent the diaphragm. Also, the shielded capacitive pressure transducer can further include a passivation layer formed of an insulative material disposed between the base electrode and the diaphragm electrode In a further more detailed aspect, the shielded capacitive pressure transducer can be configured so that the electrodes each comprise a metal layer comprising gold disposed on the diaphragm and substrate, respectively. Additionally, the diaphragm can be formed of material comprising a ceramic material.

In another more detailed aspect, the seal can comprise an O-ring. Also, the base electrode can be configured so that it further comprises a primary electrode portion and a reference electrode portion electrically isolated from the primary electrode portion.

Further details, aspects and advantages of the invention will be apparent with reference to the appended drawings and the following more detailed description of exemplary embodiment(s). However, no limitation of the scope of the invention is to be inferred by description of specific detailed examples.

DESCRIPTION OF THE DRAWINGS

FIG. 4 is an exploded view of a configuration of a portion of the capacitive pressure transducer shown in FIGS. 1 and 2.

DETAILED DESCRIPTION OF THE PREFERRED EMBODIMENT(S)

Figure 1:
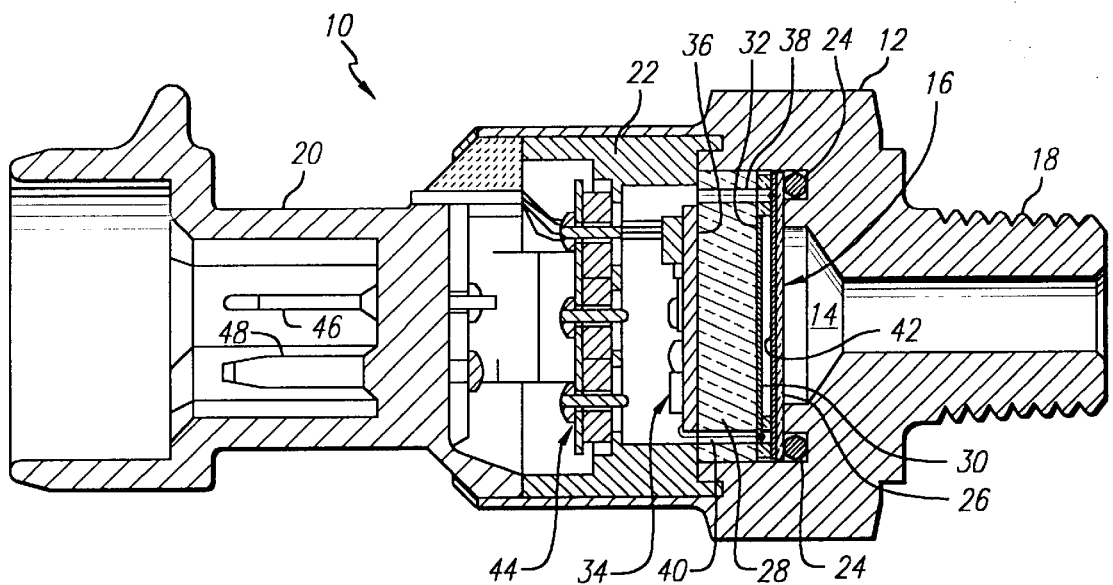
FIG. 1 is a cross sectional view of a pressure transducer in accordance with principles of the invention illustrating the environment of the invention.

With reference to FIG. 1 of the drawings, which are provided for purposes of illustration, and not by way of limitation of the scope of the invention, a shielded, dielectric-fluid-insensitive, pressure transducer 10 includes a housing 12 formed of metal defining a chamber 14 adjacent a sensor assembly 16. The housing further comprises a threaded connector 18 configured for connecting the transducer to a fluid system (not shown). An electrical connector 20 is configured for connecting the transducer to an electrical system (not shown), such as the control system of a vehicle incorporating the fluid system. A spacer 22 is disposed between the sensor assembly and the electrical connector, which allows wiring connections and electrical components to be disposed within the transducer. The housing 12 includes a swaged portion 24 holding the transducer components tightly together.

The transducer 10 further comprises a seal 24, which in the illustrated embodiment comprises a natural or synthetic rubber O-ring. When the components of the transducer are assembled and pushed tightly together by the swaged portion 24 of the housing 12, the O-ring is compressed between the housing and a diaphragm 26 comprising a portion of the sensor assembly 16 in contact with, and therefore coupled to a fluid within the chamber 14 defined by the housing. The sensor assembly further comprises a ceramic substrate 28 which carries a base electrode 30 comprising a layer of gold metal deposited thereon on a facing side 32, and electrical connections and components 34 carried on an opposite, connector, side 36. The substrate further defines openings 38, 40 therethrough accommodating wires for making electrical connections to a diaphragm electrode 42 and the base electrode 30, respectively. Further accommodation 44 for wiring and connections is provided within the spacer 22 as mentioned above. Metal contacts 46, 48 are provided in the connector for making electrical connection to the electrical system (not shown) as is well known in the art.

Figure 2:
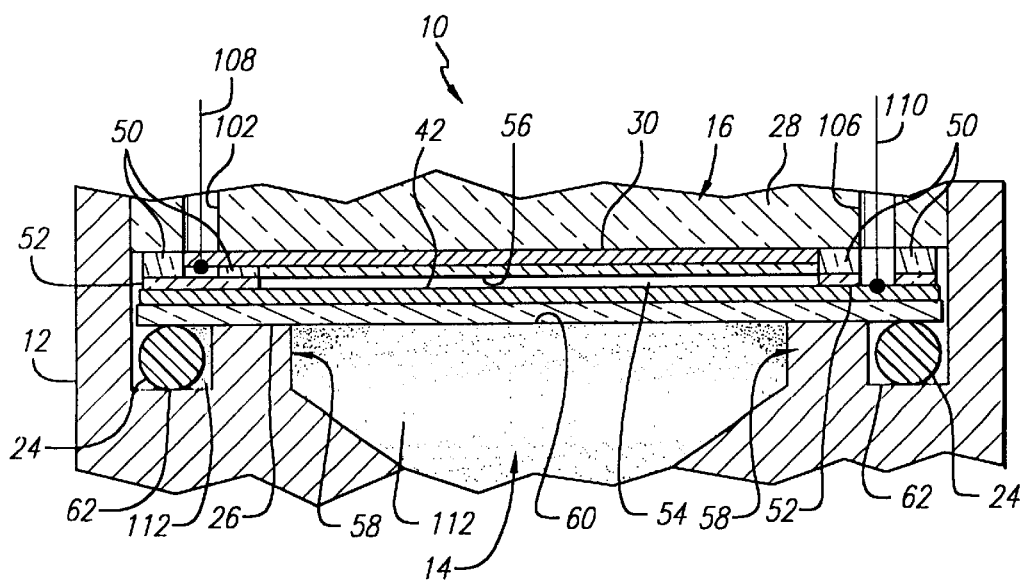
FIG. 2 is an enlarged cut-away cross sectional view of a portion of the pressure transducer shown in FIG. 1 illustrating in more detail principles of the invention.

Turning now to FIG. 2, in more detail the sensor assembly 16 of the pressure transducer 10 includes a layered construction including the substrate 28 formed of a ceramic material, and a base electrode 30 formed of a layer of gold metal attached to, or deposited thereon. The construction further comprises the diaphragm 26 positioned adjacent the fluid chamber 14. The diaphragm electrode 42 is likewise formed of gold metal, attached to or deposited on the diaphragm. The diaphragm comprises a low hysteresis material such as a glass or ceramic material. A base frit 50 cooperates with a diaphragm frit 52 to provide a space 54 between the electrodes 30, 42. Other non-conductive materials can be used. These frits are doughnut shaped and formed of a ceramic material. Other non-conductive materials can be used. The frits are disposed about the periphery of the substrate 28 and diaphragm 26. A glass passivater 56 is disposed over the base electrode 30 to electrically isolate it from the diaphragm electrode 42. Fusion by heat, epoxy, or other suitable adhesive, can be used to attach the layers of the construction.

As will be appreciated, other configurations (not shown) are possible. For example, the diaphragm could be formed entirely of metal, and could itself comprise the electrode without an additional conductive layer, provided the transducer application allowed use of a metal or metal alloy without compromising accuracy due to hystereis. Numerous other possibilities for alteration of the details of the construction of the transducer are possible while still implementing the principles of the invention.

An annular stop 58 supports the diaphragm 26 on a wetted side 60 thereof, preventing excessive deformation of the O-ring 24. As will be appreciated however, a fluid can eventually migrate between the stop and the wetted side of the diaphragm to a channel 62 which receives the O-ring. The fluid is stopped from further outward migration by the seal comprising the O-ring. Both the diaphragm and the diaphragm electrode 42 deposited thereon extend outwardly beyond the seal. As will be appreciated in light of the discussion above, if the electrode did not extend to the seal the presence of a dielectric fluid in the radially outlying space comprising the channel could alter the capacitance. This would affect the output from the transducer, and so the pressure level sensed.

Figure 3:
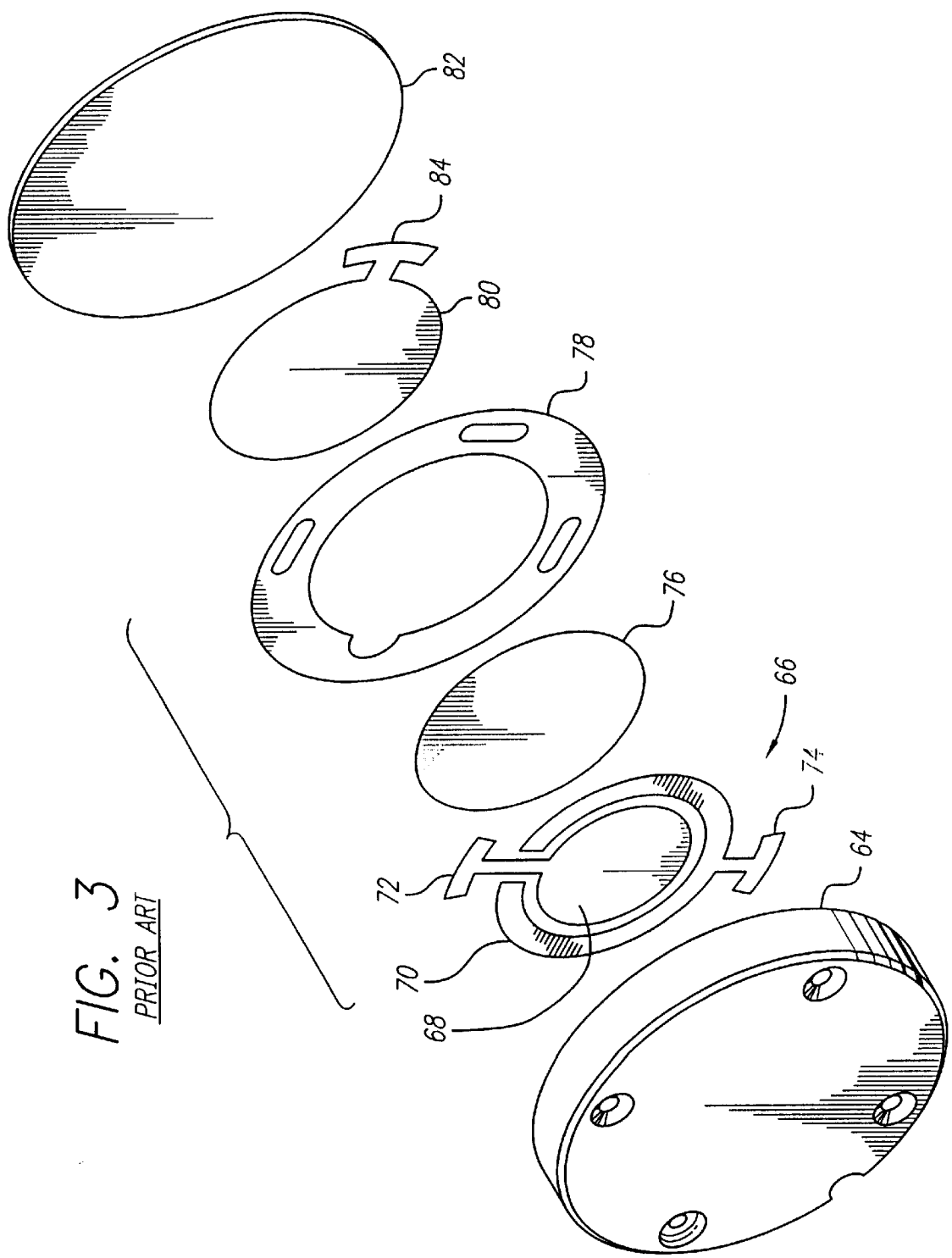
FIG. 3 is an exploded view of a prior configuration of a portion of a capacitive pressure transducer.

By way of illustration, comparison of a prior device configuration, as shown in FIG. 3 with that of the sensor 10 in accordance with the invention shown in FIG. 4 will now be made. The prior sensor assembly includes a substrate 64, and a base electrode 66, further comprising a primary 68 portion and reference portion 70 and contact tabs 72, 74. A glass passivator 76 protects the base electrode. A frit 78 separates a diaphragm electrode 80 deposited on a diaphragm 82 from the base electrode. The diaphragm electrode also incorporates a contact tab 84. Note that the size of the diaphragm electrode is roughly the same as the base electrode.

In contrast, the diaphragm electrode 42 of the present invention shown in FIG. 4 is much larger, and extends radially outward beyond the base electrode 30. As can be seen, the base electrode in accordance with the present invention can also comprise a primary portion 86 and a reference portion 88, as well as contact tabs 90, 92. Openings 94, 96, 98, 100 in the frits 50, 52 allow for electrical connection of the electrodes, and allow such connection without pressure being applied to the connection by the frits. Holes 102, 104, and 106 allow wires (108, 110 in FIG. 2) to pass through the substrate 28 for electrical connections. The two configurations share many features, but the diaphragm electrode of the present invention shown in FIG. 4 is larger and extends radially outward to shield the base electrode from variations in conditions behind the electrode. Most importantly, the presence and/or outward spreading of a problematic fluid such as water adjacent the wetted side 60 of the diaphragm 26, which otherwise can vary the capacitance of the sensor assembly 16, and thereby make the pressure transducer less accurate in sensing pressure is mitigated.

The reference portion 88 of the base electrode 30 is provided to improve accuracy, as capacitance between it and the diaphragm electrode 42 will change less with respect to deflection of the diaphragm 26 than capacitance between the primary portion 86 and the diaphragm electrode. However, changes in capacitance due to thermal effects will affect the two portions 86, 88 about equally due to their close proximity to each other, and therefore changes in capacitance due to deflection of the diaphragm can be differentiated from changes due to thermal effects. More accurate pressure sensing is thereby made possible.

A hole 103 is provided in the substrate 28, which cooperates with notches 105, 107 to provide fluid communication through the substrate into the space (54 in FIG. 2) between the diaphragm electrode 42 and the passivator 56. This can be used to evacuate the space of air, and the hole can then be plugged, maintaining a vacuum within the space otherwise filled with air. This further increases accuracy in that the effect of the variable thickness of the layer of air between electrodes is eliminated.

Returning to FIG. 2, a water vapor fluid 112 in the chamber 14 migrates past the stop 58 outwardly into the channel 62 containing the O-ring seal 24. The water vapor is stopped by the seal but has traveled radially outward to a point beyond the periphery of the diaphragm electrode 80 of prior art devices, but which is still shielded by the diaphragm electrode 42 of a sensor assembly 16 according to the invention. The water molecules "see" only the diaphragm electrode from the wetted side of the diaphragm, and not the oppositely charged base electrode. Accordingly they are not attracted to an alignment orientation between the two centers of opposite charge, and no change in capacitance observed, due to this configuration.

It will be appreciated that performance of a pressure transducer 10 is improved by application of principles of the invention. In sensing a pressure of a dielectric fluid, such as water, accuracy of the transducer is enhanced by shielding provided by the larger electrode 42 of the diaphragm 26. Recognition and mitigation of the problem represents a material advance in the art.

While specific embodiment(s) of the invention have been illustrated and described it will be understood that numerous improvements and modifications can be made without departing from the spirit and scope of the invention. It is not intended that the device be limited to the embodiment(s) disclosed herein or their equivalents, nor is it intended that the appended claims be interpreted as being thus limited.

We claim:

1. A shielded capacitive pressure transducer, comprising:
   a housing;
   a sensor assembly carried by the housing, the sensor assembly further comprising:
      a diaphragm having a wetted side and a facing side;
      a substrate having a facing side disposed in facing relationship to the diaphragm;
      a spacing frit disposed between the diaphragm and the substrate such that a gap is formed between the diaphragm and the substrate;
      a base electrode disposed on the facing side of the substrate; and
      a diaphragm electrode disposed on the facing side of the diaphragm, the two electrodes forming a capacitors; and the diaphragm electrode being configured so that it extends radially outward substantially beyond the base electrode and any electrical connections thereto; and
   an annular seal disposed adjacent the wetted side of the diaphragm and configured to provide a seal between the diaphragm and the housing, whereby fluid adjacent the diaphragm is prevented from migrating radially outward of the seal and is confined to a portion of the wetted side of the diagram radially inward from the annular seal, the annular seal being disposed no farther radially outward in any radial direction than the diaphragm electrode disposed on the opposite facing side of the diaphragm so that the diaphragm electrode acts as a shield to mitigate the change in capacitance of said capacitor from the effect of presence of a fluid that otherwise affects capacitance when adjacent the wetted side and not shielded from the base electrode by the diaphragm electrode.

2. The shielded capacitive pressure transducer of claim 1, further comprising a passivation layer formed of an insulative material disposed between the base electrode and the diaphragm electrode.

3. The shielded capacitive pressure transducer of claim 1, further comprising a fluid chamber defined by the housing and the diaphragm and the annular seal, configured to confine a pressurized fluid adjacent the diaphragm.

4. The shielded capacitive pressure transducer of claim 1, wherein the electrodes each comprise a metal layer comprising gold disposed on the diaphragm and substrate, respectively.

5. The shielded capacitive pressure transducer of claim 1, wherein the diaphragm comprises a ceramic material.

6. The shielded capacitive pressure transducer of claim 1, wherein the seal comprises an o-ring.

7. The shielded capacitive pressure transducer of claim 1, wherein the base electrode further comprises a primary electrode portion and a reference electrode portion electrically isolated from the primary electrode portion.

8. The shielded capacitive pressure transducer of claim 1, wherein the diaphragm electrode is sized in comparison to the base electrode so as to be of substantially larger dimension measured in a radially outward direction.

9. The shielded capacitive pressure transducer of claim 1, wherein the diaphragm electrode has an extent substantially the same as the diaphragm measured in a radially outward direction.

10. A shielded capacitive pressure sensor, comprising:
    a diaphragm having a wetted side and a facing side;
    a diaphragm electrode comprising at least the facing side of the diaphragm;
    a base electrode disposed in facing relationship to the diaphragm electrode, and spaced apart therefrom so that a gap is formed between the diaphragm electrode and the base electrode, the diaphragm electrode and the base electrode forming a capacitor in which the capacitance of the capacitor varies with relative position of the diaphragm electrode with respect to the base electrode, which varies with displacement of the diaphragm due to a fluid pressure acting on at least a part of the wetted side of the diaphragm, the diaphragm electrode extending substantially farther outward in a radial direction than the facing base electrode and any electrical connections thereto; and
    a seal adjacent the wetted side of the diaphragm limiting the area of the wetted side of the diaphragm in contact with a fluid being sensed to one which extends radially outward in any direction no father than the radial outward extent of the diaphragm electrode in the same direction, whereby the diaphragm electrode acts as a shield to mitigate interference with capacitive interaction of the base and diaphragm electrodes due to presence of the fluid.

11. The shielded capacitive pressure transducer of claim 10, further comprising a housing defining a chamber adjacent the diaphragm, the seal being disposed between the diaphragm and the housing such that fluid in the chamber is confined by the diaphragm, seal and housing, the housing further defining a connection adapted to allow fluid communication connection of the chamber to a fluid system.

12. The shielded capacitive pressure transducer of claim 11, wherein the seal comprises an o-ring comprising an elastomeric material.

13. The shielded capacitive pressure transducer of claim 12, where the diaphragm comprises a ceramic material.

14. The shielded capacitive pressure transducer of claim 13, wherein the diaphragm electrode comprises a layer of metal deposited on the facing side of the diaphragm.

15. The shielded capacitive pressure transducer of claim 14, wherein the base electrode comprises a primary electrode portion comprising a layer of metal deposited on the substrate, and a reference electrode portion comprising a layer of metal deposited on the substrate at a location radially outward from the primary electrode, the primary and reference electrode portions being electrically isolated from each other.

16. The shielded capacitive pressure transducer of claim 15, further comprising a passivator layer of electric insulation material disposed between the base electrode and the diaphragm electrode.

17. The shielded capacitive pressure transducer of claim 16, further comprising an electrical connector carried by the housing, the electrical connector being electrically connected to the base electrode primary and reference portions and to the diaphragm electrode.

18. The shielded capacitive pressure transducer of claim 17, further comprising an electrical circuit carried within the housing configured for converting an input voltage, based on a capacitance of the sensor, to an electrical voltage output indicative of a pressure of the fluid in the chamber.

19. The shielded capacitive pressure transducer of claim 18, where the pressure and output voltage are linearly related.

20. The shielded capacitive pressure transducer of claim 10, wherein the diaphragm electrode is sized in comparison to the base electrode so as to be of substantially larger dimension measured in a radially outward direction.

21. The shielded capacitive pressure transducer of claim 10, wherein the diaphragm electrode has an extent substantially the same as the diaphragm measured in a radially outward direction.

22. A shielded capacitive pressure sensor comprising:

a diaphragm formed of a low hysteresis material, having a wetted side and a facing side;

a diaphragm electrode comprising a layer of metal disposed on at least a portion of the facing side of the diaphragm;

a substrate having a side in facing relationship to the diaphragm electrode;

a base electrode comprising a layer of metal disposed on at least a portion of the side of the substrate in facing relationship to the diaphragm electrode, and spaced apart therefrom so that a gap is formed between the diaphragm electrode and the base electrode, the diaphragm electrode and the base electrode forming a capacitor in which the capacitance of the capacitor varies with relative position of the diaphragm electrode with respect to the base electrode, which varies with displacement of the diaphragm due to a fluid pressure acting on at least a part of the wetted side of the diaphragm, and the diaphragm electrode extending substantially farther radially outward in a radial direction than the facing base electrode and any electrical connections thereto;

a spacer disposed between the diaphragm and the substrate adjacent the circumference of the substrate at the radially outward extent of the substrate, whereby the gap between the base electrode and the diaphragm electrode is maintained; and a seal adjacent the wetted side of the diaphragm limiting the area of the wetted side of the diaphragm in contact with a fluid being sensed to one which extends radially outward in any direction no father than the radial outward extent of the diaphragm electrode in the same direction, whereby the diaphragm electrode acts as a shield to shield the fluid from the base electrode.

23. The shielded capacitive pressure transducer of claim 22, wherein the diaphragm is formed of a ceramic material.

24. The shielded capacitive pressure transducer of claim 23, wherein the seal comprises an o-ring.

25. A shielded capacitive pressure sensor, comprising:

a diaphragm having a wetted side and a facing side;

a diaphragm electrode having an extent substantially equal to the extent of the diaphragm;

a base electrode disposed in facing relationship to the diaphragm electrode, and spaced apart therefrom so that a gap is formed between the diaphragm electrode and the base electrode, the diaphragm electrode and the base electrode forming a capacitor in which the capacitance of the capacitor varies with relative position of the diaphragm electrode with respect to the base electrode, which varies with displacement of the diaphragm due to a fluid pressure acting on at least a part of the wetted side of the diaphragm, and the base electrode and any electrical connections thereto extending outward in a radial direction to a distance substantially less than that of the facing diaphragm electrode; and a seal adjacent the wetted side of the diaphragm limiting the area of the wetted side of the diaphragm in contact with a fluid being sensed, whereby the diaphragm electrode acts as a shield to shield the fluid from undesirably affecting the pressure variable capacitance.

* * * * *

UNITED STATES PATENT AND TRADEMARK OFFICE
CERTIFICATE OF CORRECTION

PATENT NO. : 6,148,674 B1
DATED : July 16, 2002
INVENTOR(S) : Robert Deraedt

It is certified that error appears in the above-identified patent and that said Letters Patent is hereby corrected as shown below:

<u>Column 8,</u>
Lines 47, 50, 53 and 55, change "comer" to -- corner --.

Signed and Sealed this

Fourteenth Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.    : 6,148,674
DATED         : November 21, 2000
INVENTOR(S)   : Kyong M. Park et al.

It is certified that error appears in the above-identified patent and that said Letters Patent is hereby corrected as shown below:

This certificate supersedes Certificate of Correction issued January 14, 2003, the number was erroneously mentioned and should be vacated since no Certificate of Correction was granted.

Signed and Sealed this

Twenty-second Day of April, 2003

JAMES E. ROGAN
*Director of the United States Patent and Trademark Office*